United States Patent Office 3,203,961
Patented Aug. 31, 1965

3,203,961
INDOLYLETHYLPYRROLIDONE COMPOUNDS
Yao Hua Wu, Evansville, Ind., assignor to Mead Johnson & Company, Evansville, Ind., a corporation of Indiana
No Drawing. Filed Mar. 21, 1963, Ser. No. 266,823
The portion of the term of the patent subsequent to May 11, 1982, has been disclaimed
4 Claims. (Cl. 260—319)

This invention is concerned with heterocyclic substituted ethylamine compounds having the following formula. In this formula R refers to a lower alkyl group having 1 to 4 carbon atoms.

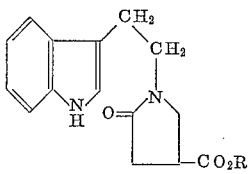

These substances are intermediates for the preparation of medicinal products. For example, on cyclodehydration thereof according to methods for the production of β-carbolines from acylated tryptamines, 2,3,5,6-tetrahydroindolo[3,2-g]1H-indolizinium salt bearing an alkyl carboxylic ester group in the 2-position is obtained. The latter are reduced to provide 2-hydroxymethyl-1,2,3,5,6-11b-hexahydroindolo[3,2-g]indolizine, which, on esterification, provides end products having tranquilizer activity. These transformations are the subject of copending applications Serial Number 266,802 and Serial Number 266,812, now U.S. Patent No. 3,183,237, of Y. H. Wu and H. J. Rhodes filed herewith. The biologically active end products are claimed in application Serial Number 266,802.

The present substances are prepared by reaction of tryptamine with a di-lower alkyl ester of itaconic acid. The reaction is thought to take place by addition of the strongly basic primary amino group to the ethylenic bond of the itaconic ester followed spontaneously by cyclization to provide an alkyl 1-[2-(3-indolyl)ethyl]-5-oxopyrrolidine-3-carboxylate having the above formula. The reaction takes place at room temperature (25° C.) on mixing of the two reactants, preferably employing at least one equivalent proportion of dialkyl itaconate, but an excess thereof if desired. The process proceeds at a more rapid rate at elevated temperature, temperatures up to 200° C. being satisfactory.

Reaction inert solvents may be employed, and in fact such is the preferred method of operation. Reaction inert solvents are those which do not react destructively with the reactants or product at reaction temperatures. It is preferred to use a relatively volatile solvent. In practice, methanol has been found to be a wholly satisfactory solvent, both due to its relative ease of removal at termination of the reaction period and because a suitable reaction temperature is provided by a refluxing mixture of it with the two reactants. Use of from about 1 to 5 parts by weight of methanol relative to the weight of reactants is satisfactory. A reaction period of about 4 to 24 hours constitutes the preferred time period. Other applicable solvents include ethanol, isopropanol, benzene, tetrahydrofuran, toluene, xylene, dioxane, dibutyl ether, etc.

The process is applicable to all manner of itaconic esters, including the higher alkyl, aralkyl, and aryl ester as well as a variety of unsaturated hydrocarbon esters, so long as no interfering reactive functional group is present. Likewise the nature of the ester residue is of little consequence to the further conversion of the present compounds, as is contemplated in the aforementioned patent applications, as will be apparent to those skilled in the art. It is preferred to use the lower alkyl esters such as the methyl, ethyl, isopropyl, butyl, and isobutyl esters for economic reasons and operating convenience. The methyl ester is preferred.

The following examples illustrate preparation of the compounds of the above formula.

EXAMPLE 1

Methyl 1-[2-(3-indolyl)ethyl]-5-oxopyrrolidine-3-carboxylate

A mixture of tryptamine, 32.1 g. (0.2 mole), dimethyl itaconate, 33.3 g. (0.21 mole), and 320 ml. of absolute methanol is refluxed for 24 hrs. The oily residue (57 g.) obtained after concentrating the mixture solidifies on scratching. The crude product is purified by recrystallization from a 1:1 mixture of ethanol and n-heptane, M.P. 114–116° C. [B.P. 250° C. (0.3 mm.)], weight 50.0 g. (87.5%).

Analysis.—C, 67.23; H, 6.06, which corresponds to the molecular formula $C_{16}H_{18}N_2O_3$.

EXAMPLE 2

Butyl 1-[2-(3-indolyl)ethyl]-5-oxopyrrolidine-3-carboxylate

The procedure of Example 1 is repeated, substituting di-n-butyl itaconate for the dimethyl itaconate specified in that example on a proportional molecular basis.

While several particular embodiments of this invention are shown above, it will be understood that the invention is not to be limited thereto, since many modificactions may be made, and it is contemplated, therefore, by the appended claims to cover any such modifications as fall within the true spirit and scope of this invention.

What is claimed is:
1. A compound of the formula:

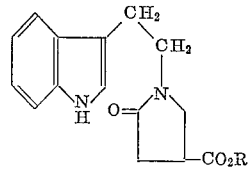

wherein R is lower alkyl of 1 to 4 carbon atoms.
2. Methyl - 1-[2-(3-indolyl)ethyl]-5-oxopryrrolidine-3-carboxylate.
3. n-Butyl 1 - [2-(3-indolyl)ethyl]-5-oxopyrrolidine-3-carboxylate.
4. The process for preparing a compound as defined in claim 1 which comprises reacting at least one molecular proportion of dialkyl itaconate wherein said alkyl group is of 1 to 4 carbon atoms with tryptamine at a temperature of 25° C. to 200° C.

References Cited by the Examiner
UNITED STATES PATENTS
3,075,986   1/63   Jacob et al. _____ 260—319

OTHER REFERENCES
Stork et al.: J. Am. Chem. Soc., vol. 79, pp. 495–500 (1957).
Wheeler et al.: J. American Pharmaceutical Association, vol. 40, pp. 589–590 (1951).

NICHOLAS S. RIZZO, *Primary Examiner.*